United States Patent Office

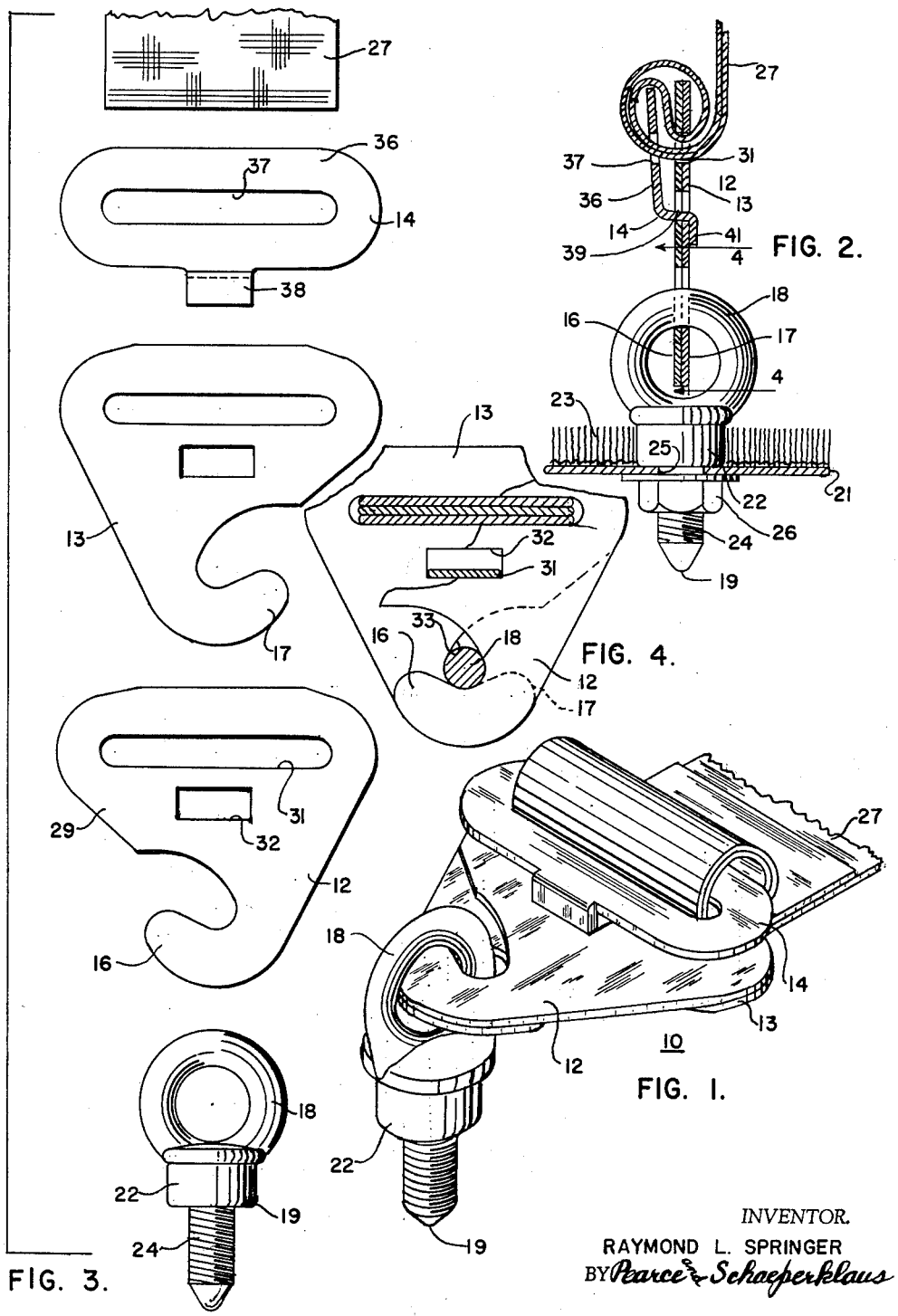
April 7, 1964  R. L. SPRINGER  3,127,652
ANCHOR ASSEMBLY FOR SEAT BELT
Filed April 25, 1962
INVENTOR.
RAYMOND L. SPRINGER
BY Pearce & Schaeperklaus
Attorneys

3,127,652
Patented Apr. 7, 1964

3,127,652
ANCHOR ASSEMBLY FOR SEAT BELT
Raymond L. Springer, Anderson Township, Hamilton County, Ohio, assignor to The Auto Sun Products Company, Cincinnati, Ohio, a corporation of Ohio
Filed Apr. 25, 1962, Ser. No. 190,052
4 Claims. (Cl. 24—165)

This invention relates to safety belts for vehicles and the like. More particularly, this invention relates to an improved anchoring device for attaching an end portion of a safety belt to a floor panel or the like of a vehicle.

An object of this invention is to provide a strong rigid anchoring device for an end of a safety belt which requires no members extending through or perforating the web of the belt.

A further object of this invention is to provide an anchoring device of this type which permits ready adjustment of the length of the belt.

A further object of this invention is to provide an anchoring device of this type for an end of the belt which includes hook members which engage an eye member or the like attached to a floor panel of a vehicle and in which the hook members are held by a lock member to prevent release of hooks thereof unless the assembly of lock member and hook members is substantially dismantled.

A further object of this invention is to provide an anchoring device of this type in which a pull on the safety belt tightens the lock and hook member assembly.

A further object of this invention is to provide an anchoring device of this type in which a pair of slotted plate members having hook portions are mounted on the web of the safety belt with the hook portions overlapping and in which a lock member is also mounted on the web of the safety belt with the lock member having a portion which extends through openings in the hook members to hold the hook members assembled with the hook portions thereof engaging the eye member.

The above and other objects and features of the invention will be apparent to those skilled in the art to which this invention pertains from the following detailed description, and the drawing, in which:

FIG. 1 is a perspective view showing an anchoring device constructed in accordance with an embodiment of this invention, an end portion of a web of a safety belt being shown in association therewith;

FIG. 2 is a view in side elevation showing the anchoring device mounted upon a floor panel of a vehicle;

FIG. 3 is an exploded view of the anchoring device illustrated in FIGS. 1 and 2, and FIG. 4 is a view in section taken on a line 4—4 in FIG. 2.

In the following detailed description and the drawing, like reference characters indicate like parts.

In FIG. 1 is shown a belt anchoring assembly 10 constructed in accordance with an embodiment of this invention. The anchoring assembly includes a pair of hook plates 12 and 13 and a lock member 14. Hook end portions 16 and 17 of the hook plates 12 and 13, respectively (FIG. 2) engage an eye 18 of an eye-bolt 19. As shown in FIG. 2 the eye-bolt 19 can be mounted on a floor panel 21 of an automobile or the like with an upper shank portion 22 of the eye-bolt extending through a rug 23 or the like mounted on the floor and a lower shank portion 24 extending through an opening 25 in the floor panel and receiving a nut 26 threaded thereto to mount the eye-bolt 19 in position on the floor panel 21. An end portion of a web 27 is threaded through the hook plates and lock member, as will be described more fully hereinafter. The web can be of strong fabric of the type usually used in safety belts. Details of construction of the elements of the anchoring assembly are shown in FIG. 3.

The hook plates 12 and 13 are similar in construction, and only the hook plate 12 will be described in detail. The hook plate 12 (FIG. 3) includes a body 29 provided with a large main slot 31 of a length to receive the web 27 and a smaller locking slot 32 closer to the hook portion 16 than the main slot 31. As shown in FIG. 4, when the hook plates 12 and 13 are mounted with slots thereof aligned, the hook portions 16 and 17 overlap and define an opening 33 for receiving the eye portion 18 of the eye-bolt.

The lock plate 14 (FIG. 3) includes a body portion 36 provided with a slot 37 of substantially the same dimensions as the main slots of the hook plates. A tongue 38 having a main portion 39 (FIG. 2) projecting perpendicular to the body portion and a flange 41 parallel thereto is integral with the body portion 36 and is adapted to fit with the main portion of the tongue extending through the lock slots of the hook plates, as shown in FIGS. 2 and 4 and the flange 41 in position to engage the body portion of one of the hook plates, to prevent release of the hooks of the hook plates from the eye 18 of the eye-bolt 19 when the web is threaded through the main slots of the hook plates.

The manner in which the web 27 is threaded through the plates and lock member is shown most clearly in FIG. 2. The end of the web extends through the main slots 31 of the hook plates 12 and 13, the slot 37 of the lock plate 14, around the outside of the lock plate 14, back through the main slots 31 of the hook plates 12 and 13, around the back of the hook plates 12 and 13 and of the lock plate 14, through the slot 37 of the lock plate and through the main slots 31 of the hook plates 12 and 13. The web can extend therefrom to an appropriate buckle or the like carried thereby (not shown). When there is a pull on the web, the body of the lock member is drawn toward the bodies of the hook plates to grip the web therebetween. The lock tongue and flange of the lock member prevent release of the hook plate from the eye-bolt without a substantial dismantling of the anchor construction.

The anchor construction illustrated in the drawing and described above is subject to modification without departing from the spirit and scope of the appended claims. In particular, the arrangement of the portion of the lock plate which engages and prevents release of the hook plates may be varied in many ways as by being formed into a rivet or the like or in other ways.

Having described my invention, what I claim is new and desire to secure by Letters Patent is:

1. In a safety belt anchorable to an eye member, the combination comprising a safety belt web, an anchor for connecting an end portion of the web to the eye member, which anchor comprises a pair of hook plates, each of said hook plates including a body portion and a hook thereon, there being a main web-receiving slot in the body of each hook plate, there being a locking slot in the body of each hook plate between the main slot and the hook, the hooks being adapted to engage the eye member with the hooks overlapping, a lock plate including a body portion having a main web-receiving slot, the end portion of the web being threaded through the web-receiving slots in such a manner that a pull on the web causes the locking plate to grip the web against an adjacent one of the hook plates, and means on the lock plate extending through the locking slots on the hook plates to hold the hook plates adjacent each other to prevent release of the eye member.

2. In a safety belt anchorable to an eye member, the combination comprising a safety belt web, an anchor for connecting an end portion of the web to the eye member, which anchor comprises a pair of hook plates, each of said hook plates including a body portion and a hook thereon, there being a main web-receiving slot in the body of each hook plate, there being a locking slot in the body of each hook plate between the main slot and the hook, the hooks being adapted to engage the eye member with the hooks overlapping, a lock plate including a body portion having a main web-receiving slot, the end portion of the web being threaded through the web-receiving slots in such a manner that a pull on the web causes the locking plate to grip the web against an adjacent one of the hook plates, a tongue on the lock plate extending through the locking slots of the hook plates and a flange on the tongue engageable with the other of the hook plates to hold the hook plates adjacent each other to prevent release of the eye member.

3. In a safety belt anchorable to an eye member, the combination comprising a safety belt web, an anchor for connecting an end portion of the web to the eye member, which anchor comprises a pair of flat hook plates, each of said hook plates including a body portion and a hook integral therewith, there being a main web-receiving slot in the body of each hook plate, there being a locking slot in the body of each hook plate between the main slot and the hook, the hooks being adapted to engage the eye member with the hooks extending in opposite directions and overlapping, said lock plate including a body portion having a main web-engaging slot, the end portion of the web being threaded through the web-receiving slots in such a manner that a pull on the web causes the locking plate to grip the web against an adjacent one of the hook plates, and means on the lock plate extending through the locking slots of the hook plates to hold the hook plates substantially in flatwise engagement with each other to prevent release of the hook portions from the eye member.

4. In a safety belt anchorable to an eye member, the combination comprising a safety belt web, an anchor for connecting an end portion of the web to the eye member, which anchor comprises a pair of hook plates, each of said hook plates including a body portion and a hook thereon, there being a main web-receiving slot in the body of each hook plate, the hooks being adapted to engage the eye member with the hooks overlapping, a lock plate including a body portion having a main web-receiving slot, the end portion of the web being threaded through the web-receiving slots in such a manner that a pull on the web causes the locking plate to grip the web against an adjacent one of the hook plates, and means linking the lock plate and the hook plates intermediate the web-receiving slots and the hooks to loosely connect the plates, the linking means being sufficiently tight to hold the hook plates adjacent each other and prevent release of the eye member when there is a pull on the web.

References Cited in the file of this patent
UNITED STATES PATENTS

| | | |
|---|---|---|
| 384,512 | Dillon | June 12, 1888 |
| 395,663 | McCord | Jan. 1, 1889 |
| 706,678 | Moorman | Aug. 12, 1902 |
| 831,402 | Austin | Sept. 18, 1906 |
| 1,698,398 | Friedheim | Jan. 8, 1929 |
| 2,494,526 | Tungett et al. | Jan. 10, 1950 |
| 2,653,368 | Elsner | Sept. 29, 1953 |
| 3,046,056 | Greene et al. | July 24, 1962 |